United States Patent [19]

Hyppanen et al.

[11] Patent Number: 5,460,788
[45] Date of Patent: * Oct. 24, 1995

[54] CENTRIFUGAL SEPARATOR IN PRESSURE VESSEL

[75] Inventors: Timo Hyppanen, Karhula; Juhani Isaksson, Kotka; Timo Eriksson; Teuvo Pulkkinen, both of Karhula, all of Finland; Steven J. Provol, San Diego, Calif.

[73] Assignee: A. Ahlstrom Corporation, Noormarkku, Finland

[ * ] Notice: The portion of the term of this patent subsequent to Jan. 25, 2011 has been disclaimed.

[21] Appl. No.: 164,888

[22] Filed: Dec. 10, 1993

Related U.S. Application Data

[63] Continuation-in-part of Ser. No. 953,297, Sep. 30, 1992, Pat. No. 5,281,398, which is a continuation of Ser. No. 765,450, Sep. 25, 1991, abandoned.

[51] Int. Cl.⁶ ............................... F22B 1/00; F27B 15/08
[52] U.S. Cl. ................. 422/147; 422/146; 122/4 D; 110/216; 110/245; 55/269; 55/345; 55/346; 55/459.1; 55/350.1; 165/104.16
[58] Field of Search ................ 422/146–147; 122/4 D; 165/104.16; 110/216, 245; 55/269, 302, 350.1, 459.1, 337, 345, 346

[56] References Cited

U.S. PATENT DOCUMENTS

| | | | |
|---|---|---|---|
| 4,699,068 | 10/1987 | Engström | 110/216 |
| 4,732,113 | 3/1988 | Engström | 110/216 |
| 4,793,292 | 12/1988 | Engstrom et al. | 122/4 D |
| 4,865,627 | 9/1989 | Dewitz et al. | 55/302 |
| 4,869,207 | 9/1989 | Engstrom et al. | 122/4 D |
| 4,900,516 | 2/1990 | Engström et al. | 110/216 |
| 5,110,331 | 5/1992 | Williams | 55/302 |
| 5,114,581 | 5/1992 | Goldsmith et al. | 210/650 |
| 5,242,472 | 9/1993 | Sellakumar | 96/280 |
| 5,281,398 | 1/1994 | Hyppanen et al. | 422/147 |

FOREIGN PATENT DOCUMENTS

| | | |
|---|---|---|
| 481438A2 | 4/1992 | European Pat. Off. |
| 86964 | 7/1992 | Finland |

Primary Examiner—Robert J. Warden
Assistant Examiner—Hien Tran
Attorney, Agent, or Firm—Nixon & Vanderhye

[57] ABSTRACT

A pressurized fluidized bed reactor is provided utilizing a centrifugal separator having a gas space that is distinctly non-circular, preferably having a circularity of greater than or equal to 1.15. Most desirably the cyclone has a quadrate (e.g. square) cross-section, and is disposed inside of the pressure vessel along with the reactor chamber containing the fluidized bed. A number of ceramic candle or honeycomb filters may be provided connected to the gas outlet from the cyclone separator, within the pressure vessel, to filter the gas. This construction provides a minimized diameter of the pressure vessel because the reactor chamber with square cyclones is more compact than if conventional circular cross-section cyclones are employed. Also a second pressure vessel is not needed for the candle or honeycomb filters since there is sufficient room within the pressure vessel to accommodate them.

13 Claims, 6 Drawing Sheets

CENTRIFUGAL SEPARATOR IN PRESSURE VESSEL

CROSS-REFERENCE TO RELATED APPLICATIONS

This application is a continuation-in-part of application Ser. No. 07/953,297 filed Sep. 30, 1992, now U.S. Pat. No. 5,281,398, issued Jan. 25, 1994, which in turn is a continuation of Ser. No. 07/765,450 filed Sep. 25, 1991, now abandoned, the disclosures of which are hereby incorporated by reference herein.

BACKGROUND AND SUMMARY OF THE INVENTION

Pressurized fluidized bed reactors are known, such as shown in U.S. Pat. No. 4,869,207. In those reactors, a pressure vessel containing the reactor chamber is kept at superatmospheric pressure, that is a pressure of 2 bar or more, and preferably at a pressure of about 8–16 bar (for the combustor), although the pressure varies substantially from one installation to another, or within an installation. A very significant cost of such pressurized reactors, however, is the pressure vessel itself, especially for circulating fluidized bed reactors which have a larger volume of solids than bubbling bed reactors. As the volume of the pressure vessel increases, the costs escalate in a geometric rather than linear manner. Therefore, it is desirable to maintain the pressure vessel at minimum size possible. However when the conventional cyclone separator is utilized with the reactor chamber within the pressure vessel, there is significant wasted space, and the pressure vessel must be made proportionately larger in order to accommodate a conventional cyclone. If the cyclone is placed outside the pressure vessel, then seals must be provided leading the hot flue gases from the reactor chamber to the cyclone separator, and also between the cyclone separator particles recirculating conduit and the reactor chamber.

The parent application includes a cyclone separator that is distinctly non-circular, typically having a quadrate cross-section of the vortex chamber or gas space therein. It has been found according to the present invention that when the distinctly non-circular cyclone separator, or a plurality thereof, are provided in association with a pressurized fluidized bed reactor, a much more compact arrangement is provided, allowing a minimum size of the pressure vessel, and thus allowing economic construction of a pressurized fluidized bed reactor that does not require seals for the cyclone separator since the cyclone separator may be mounted directly within the pressure vessel.

The compact arrangement of the cyclone separator in the pressurized fluidized bed reactor according to the present invention has still another advantage. Because of the compact nature thereof, there is additional room for other structures, for example allowing ceramic filter elements, such as ceramic candle or honeycomb filters, to be mounted in the same pressure vessel as the reactor chamber and the cyclone separator (e.g. below or above the cyclone separator), so that a second pressure vessel need not be provided for gas filtration, thereby reducing the costs of a complete system substantially.

According to the present invention, a pressurized fluidized bed reactor is provided comprising the following elements: A pressure vessel, circular in cross-section, and capable of withstanding pressures greater than 2 bar, and having a top and a bottom. Means for pressurizing the vessel to a pressure of greater than 2 bar. A reactor chamber defined within the pressure vessel including by side walls and a ceiling. Means for introducing fluidizing gas into the reactor chamber. Means for feeding fuel into the reactor chamber. Means for leading hot combustion gases away from the reactor chamber. And, a centrifugal separator disposed within the pressure vessel, and having an inlet connected to the means for leading hot combustion gases away from the reactor chamber, a gas outlet leading from the separator out of the pressure vessel, and a return duct for recirculating separated solid particles from the separator to the reactor chamber. The centrifugal separator comprises a vertical vortex chamber having distinctly non-cylindrical walls defining an interior gas space, the gas space having a cross section that is distinctly non-circular, having a circularity greater than or equal to 1.15.

The gas space typically has a quadrate cross-section, the cyclone separator made frown substantially flat panels.

The centrifugal separator may comprise a first centrifugal separator, and there may be a second centrifugal separator having the same basic components, as described above, as the first separator. Separators may be disposed on opposite sides of the reactor chamber, connected to the reactor chamber side walls, or may be disposed on the same side of the reactor chamber positioned next to each other or one above the other. If they are positioned one above the other, and if one separator gas outlet discharges upwardly, the other (the upper separator) preferably discharges downwardly so that there is a common plenum connected to the gas outlets. Multiple substantially identical separators may be provided mounted in groups (e.g. pairs) on opposite sides of the reactor chamber. The reactor chamber may have a first cross-sectional area, and each of the separators has a second cross-sectional area of the gas space thereof, and those cross-sectional areas may be substantially equal.

The means for pressurizing the pressure vessel may comprise means for introducing oxygen containing gas under pressure at the top of the vessel to pressurize the interior of, the pressurizing gas flow also comprising means for supplying fluidizing gas to the reactor chamber at the bottom thereof. Other pressurizing mechanisms may also be utilized. A plurality of omega panels may be provided in the reactor chamber extending along the length thereof and the separators may be mounted on the lengthway sides of the reactor chamber, parallel to the omega panels.

The reactor may further comprise a plurality of ceramic filtering means such as candle, monolithic, or honeycomb filters mounted in a support structure within the pressure vessel, and having a dirty gas inlet, a clean gas outlet, and an ash outlet; the dirty gas inlet connected to the separator gas outlet. The "ceramic filtering" as used in the specification and claims means conventional ceramic candle, monolithic, or honeycomb filters, or improved filters developed in the future, capable of filtering particles out of high temperature gases such as flue gases from fluidized bed reactors. A number of different arrangements may be utilized to accommodate the ceramic filtering means. In one arrangement, the separator is mounted along a side of the reactor chamber, connected to a side wall thereof, and the gas outlet is directed downwardly, and the support structure and the ceramic filtering means filters are mounted to the same side wall of the reactor chamber as the separator, beneath the separator, the filters of the filtering means extending generally horizontally.

According to another arrangement, the separator is mounted along a side of the reactor chamber, connected to a side wall thereof, the gas outlet is directed upwardly, and the support structure and the ceramic filtering means are mounted above the reactor chamber ceiling and above the separator. According to yet another arrangement, the separator is mounted within the volume defined by the reactor chamber, the gas outlet is directed upwardly, and the support structure and the ceramic filtering means are mounted above the reactor chamber ceiling and above the separator. Alternatively, candle or monolithic filters may be disposed vertically in the dirty gas inlet provided at a first side of the reactor chamber, and the ash outlet on the second opposite side of the reactor chamber, with a downwardly sloping floor extending from the first to the second sides. In this situation the candle or monolithic filters may be of different lengths, being short adjacent to the first side and longer adjacent to the second side.

It is the primary object of the present invention to provide a compact pressurized recirculating fluidized bed reactor with the cyclone separator or separators within the pressure vessel, and one which may also accommodate ceramic filtering means eliminating the need for a separate pressure vessel for the filters. This and other objects of the invention will become clear from an inspection of the detailed description of the invention, and from the appended claims.

BRIEF DESCRIPTION OF THE DRAWINGS

FIGS. 5, 7, 9, and 11 are schematic side views of a number of different exemplary embodiments of reactors according to the present invention, while

DETAILED DESCRIPTION OF THE DRAWINGS

Figure 1:
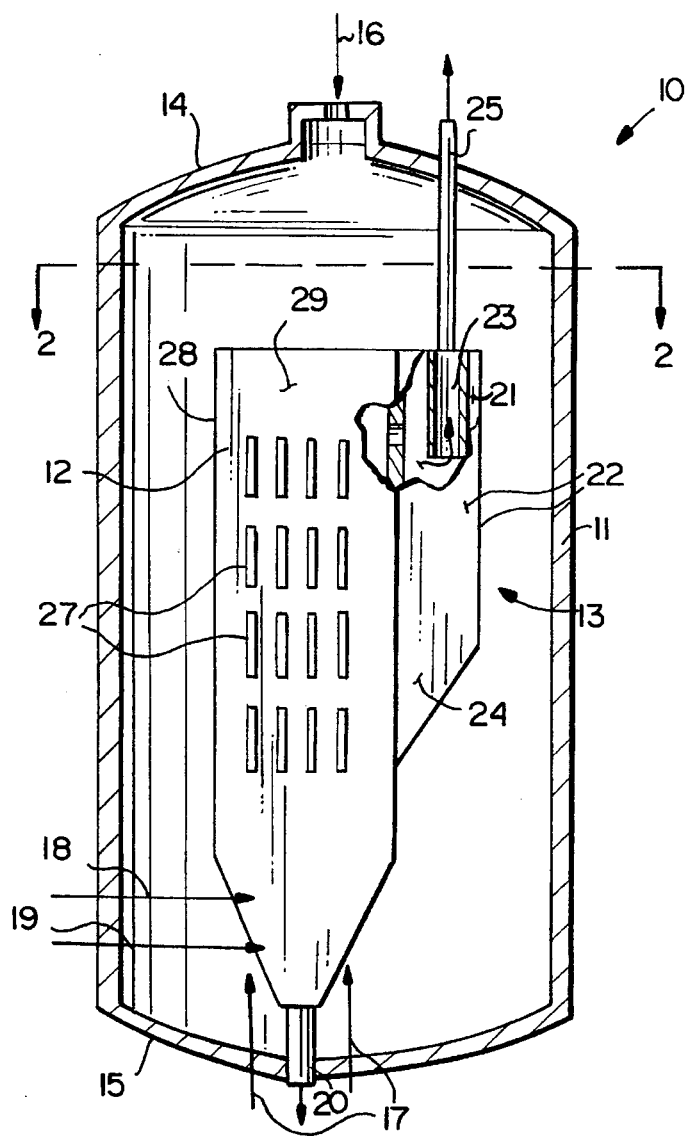
FIG. 1 is a longitudinal view, partly in cross-section and partly in elevation, of an exemplary pressurized fluidized bed reactor according to the present invention.
Figure 2:
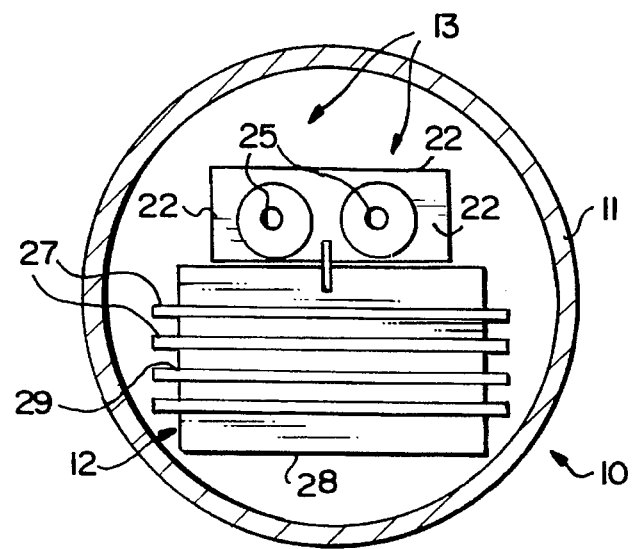
FIG. 2 is a cross-sectional view of the reactor of FIG. 1 taken along lines 2—2 thereof.

One embodiment of an exemplary pressurized circulating fluidized bed reactor according to the present invention is shown generally by reference numeral 10 in FIGS. 1 and 2. The reactor 10 comprises a pressure vessel 11 containing a reactor chamber 12 therein as well as one or more (e.g. two in FIGS. 1 and 2) centrifugal separators (cyclones) 13. The pressure vessel 11, typically made out of specialized steel, is circular in cross-section (as seen in FIG. 2), and is capable of withstanding superatmospheric pressures, greater than 2 bar (e.g. about 8–16 bar). The vessel 11 has a top 14, and a bottom 15.

Means are provided for pressurizing the vessel 11 to a pressure of greater than 2 bar (e.g. about 8–16). Pressurizing may be provided by forcing oxygen containing gas under pressure through line 16 (see FIG. 1) at the top 14 of the vessel 11, since the vessel 11 is pressure tight the entire interior volume of the vessel reaching essentially the pressure of the pressurizing gas 16. If the gas 16 is oxygen containing gas, it may also be used to flow upwardly into the reactor chamber 12 to provide combustion and/or fluidizing gas therein. Alternatively, or in addition, conduit 17 may be provided at the bottom of the chamber 12 (see FIG. 1) for introducing fluidizing gas to maintain a fluidized bed in the chamber 12. Conventional means are also provided for feeding fuel into the reactor chamber (indicated schematically at 18 in FIG. 1) and for providing other materials to the chamber, such as sorbents for absorbing pollutants (e.g. limestone), as indicated schematically at 19. The fuel may be coal, oil, biomass, or other carbon containing or hydrogen containing fuels typically in solid particulate form, or as slurry made of fuel by mixing it with e.g. water and sorbents. Also, a conventional ash discharge is provided from the reactor chamber 12, as illustrated schematically at 20 in FIG. 1.

The centrifugal separator or separators 13 according to the present invention are such as shown in the parent application. That is each separator 13 has a vertical vortex chamber 21 (see FIG. 1) having distinctly non-cylindrical walls 22 defining a vortex chamber or interior gas space 21 having a cross-section that is distinctly non-circular. Typically space 21 has a circularity greater than one, preferably greater than 1.1, and even more preferable greater than or equal to 1.15. The preferred construction, as illustrated in FIGS. 1 and 2, is a quadrate (e.g. square) cross-section for the vortex chamber 21, the separators 13 constructed of primarily substantially flat panels. Not only does this arrangement provide a more compact space, it also allows the separators 13 to be constructed more inexpensively than circular, conventional separators.

Each separator 13 also has a vortex finder 23 within the interior thereof, and a return duct 24 for recirculating separated solid particles from the separator 13 to the reactor chamber 12. A gas outlet 25 is provided from the chamber 21, concentric with the vortex finder 23, in the embodiment illustrated in FIGS. 1 and 2 the gas outlet conduit 25 passing through an appropriate seal through the top 14 of the pressure vessel 11.

As is conventional, various water cooled panels may be provided for the components within the reactor 10 in order to recover heat from combustion within the reactor chamber 12, and to maintain the longevity of the components. For example omega panels 27 of conventional construction, parallel to the lengthwise wall 28 of the reactor chamber 12 (perpendicular to the width wall 29 thereof), may be provided for recovery of heat from the chamber 12. Conventional water cooled panels may also be provided associated with the separators 13, for example the walls 22 being formed of water tubes, such as described in the parent applications.

Figure 3:
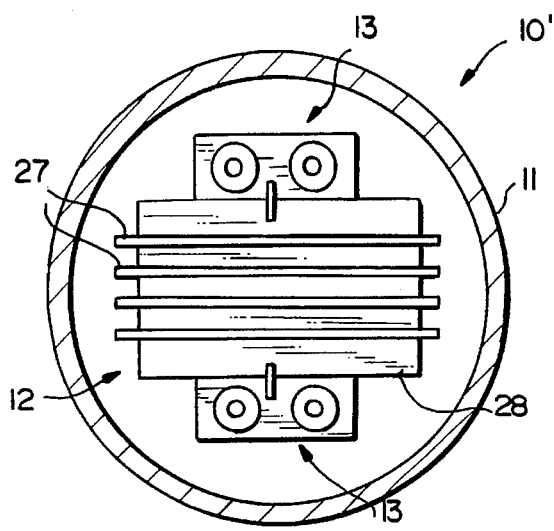
FIG. 3 is a view like that of FIG. 2 only showing a slightly different embodiment of reactor.
Figure 4:
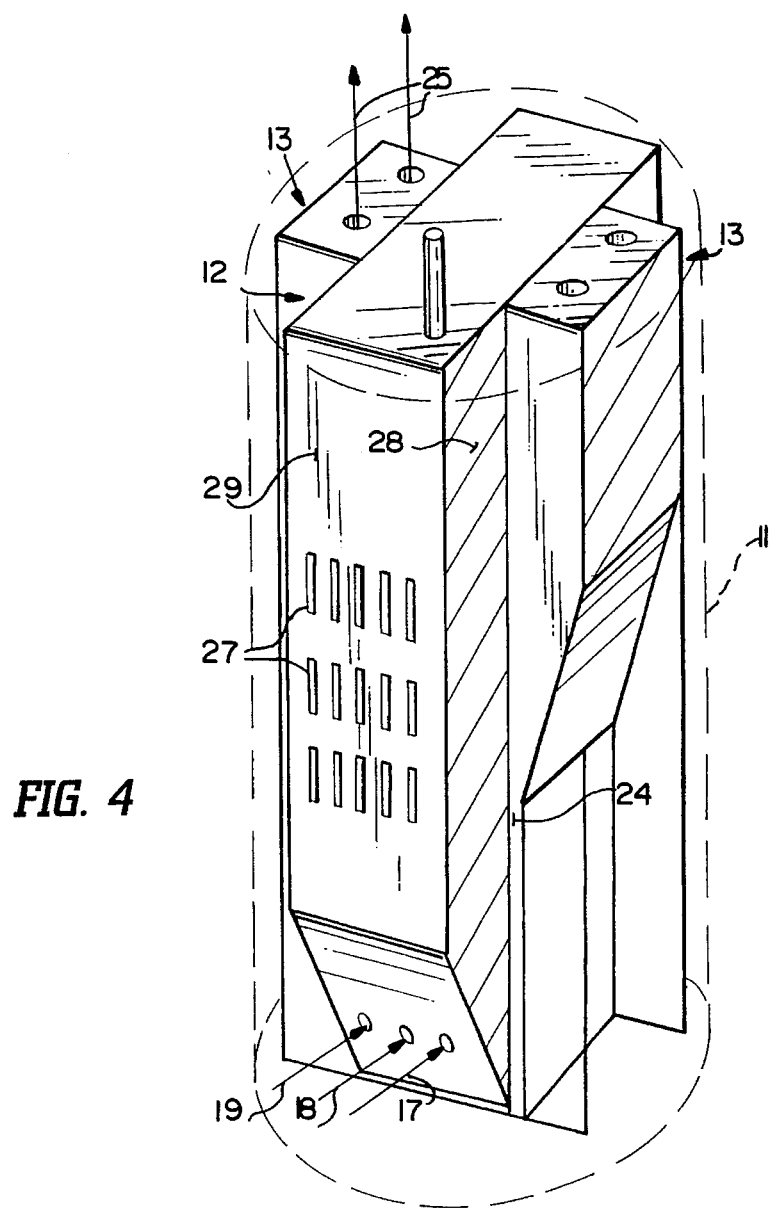
FIG. 4 is a top perspective view of the reactor of FIG. 3 showing the pressure vessel itself in dotted line.

In the embodiment of FIGS. 1 and 2, two cyclone separators 13 are provided mounted on one lengthwise wall 28 of the reactor chamber 12, side by side. This is only one exemplary embodiment, and numerous other arrangements are also possible. For example, FIGS. 3 and 4 show another reactor 10' according to the invention, the reactor 10' being identical to the reactor 10 except for the number of cyclone separators, and therefore reference numerals in FIGS. 3 and 4 being identical—for comparable components—to those in the FIGS. 1 and 2 embodiment.

Figure 5:
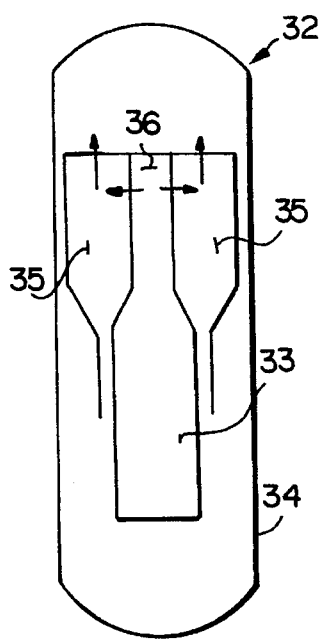

FIGS. 5 through 12 illustrate other embodiments of the invention, having the same basic components as the FIGS. 1 through 4 embodiments, but different arrangements of the cyclone separators. For example FIG. 5 shows a reactor 32 having a reactor chamber 33 within a pressure vessel 34 maintained at superatmospheric pressure, in which cyclones 35 are disposed on opposite sides of the reactor chamber 33 in such a way that the upper portion of the reactor, 36, is narrower than the main combustion portion of the reactor chamber 33, the portion 36 actually comprising part of the means for leading hot combustion gases away from the reactor chamber 33 and into the cyclones 35 as indicated by the horizontal arrows, the gas outlets being provided in the top of the separators 35 as indicated by the vertical arrows. Each structure 35 may comprise a single rectangular cyclone, or a plurality of quadrate cyclones.

Figure 7:
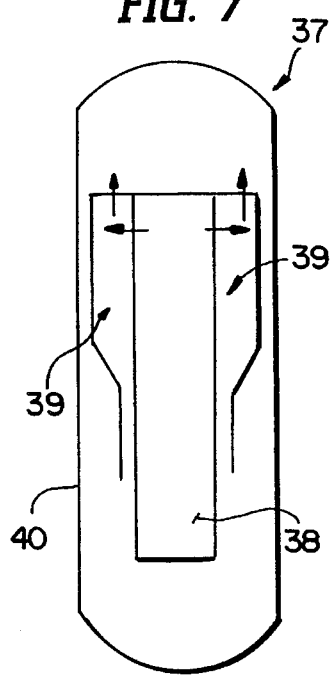
Figure 9:
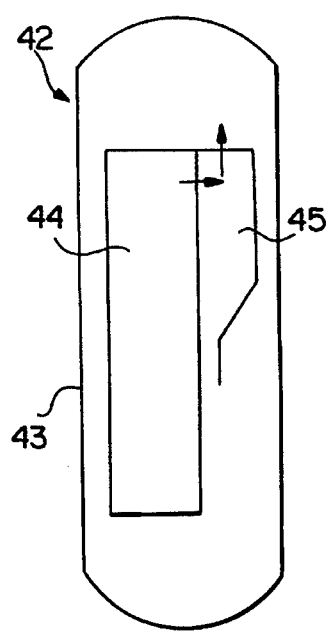
Figure 6:
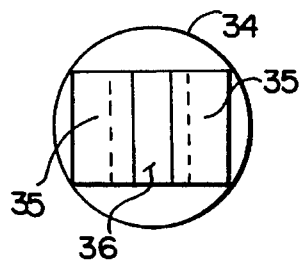
FIGS. 6, 8, and 10 are cross-sectional schematic views of the reactors of FIGS. 5, 7, and 9, respectively.
Figure 8:
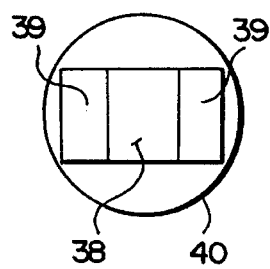
Figure 10:
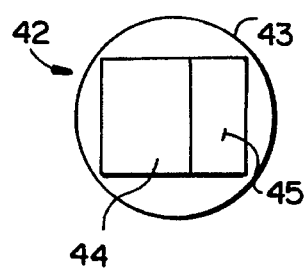

In the FIGS. 7 and 8 embodiment, the reactor 37 has a reactor chamber 38 with cyclones 39 on opposite sides thereof, however those cyclones 39 have a slightly different construction than cyclones 35 in FIGS. 5 and 6, the reactor chamber 38 being of constant cross-sectional area throughout. Components 38, 39 are within the pressure vessel 40. In the FIGS. 9 and 10 embodiment, the reactor 42 has a pressure vessel 43 in which is disposed a reactor chamber 44, having a single cyclone 45 on one side thereof.

Figure 11:
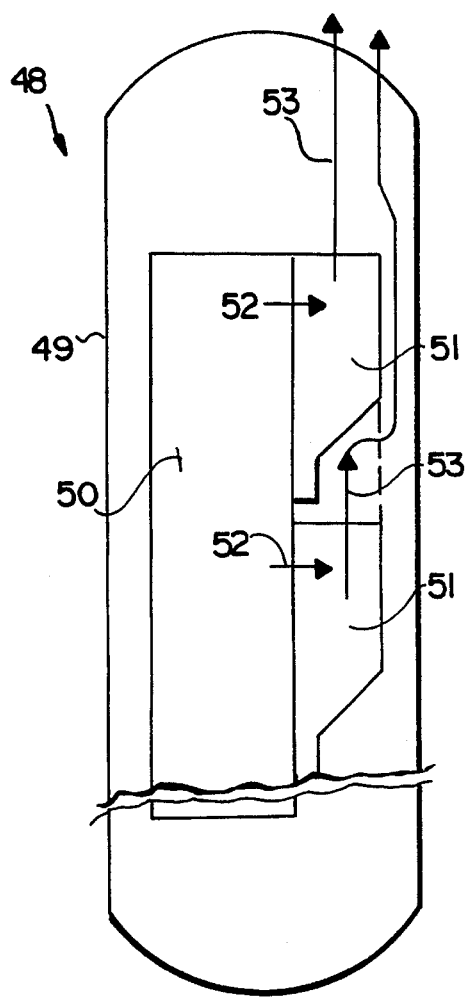

FIG. 11 illustrates a reactor 48 comprising a pressure vessel 49 with a reactor chamber 50 therein, and with two cyclones 51 provided one atop the other, with each having its own hot combustion gas inlet 52. Since the cyclones 51 are vertically stacked, an even smaller volume may be provided than in some of the other embodiments. The gas outlets 53 in this embodiment both extend upwardly from their respective cyclones 51.

Figure 12:
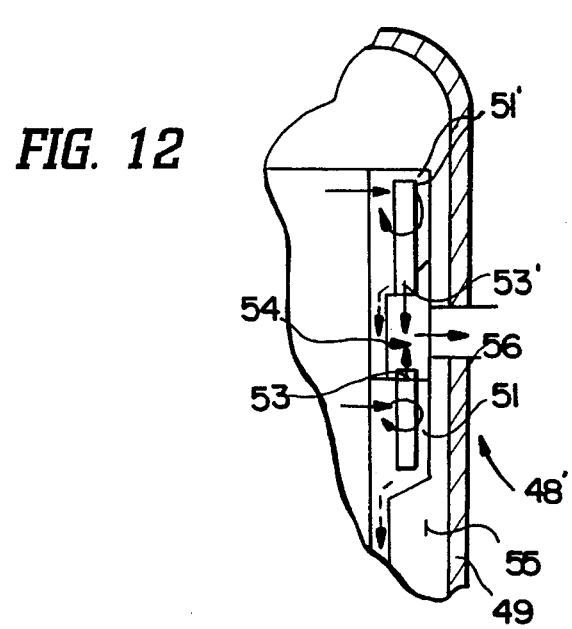
FIG. 12 is a detail cross-sectional view of a modification of the FIG. 11 embodiment, showing a different arrangement of the connection of the gas outlets from the centrifugal separators.

FIG. 12 is a cross-sectional detail view of a reactor 48' similar to the reactor 48 except that in this case the upper cyclone 51' has the gas outlet 53' therefrom extending downwardly, whereas the gas outlet 53 from the lower cyclone 51 extends upwardly. Gas outlets 53, 53' lead to a common plenum chamber 54 which is separated from the rest of the pressurized interior 55 of the pressure vessel 49, and which passes through the conduit 56 which is in sealing engagement with the pressure vessel 49, and leads the hot gases from the cyclones 51, 51' to a particle filter, or other conventional apparatus.

Figure 13:
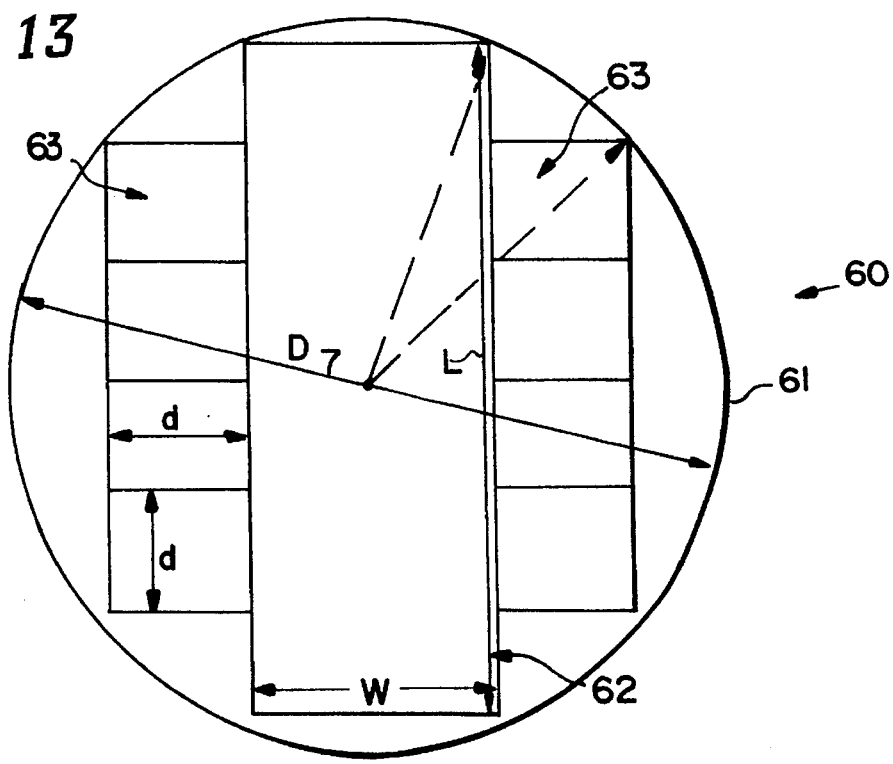
FIG. 13 is a sectional view of another embodiment of a reactor according to the present invention, showing various dimensional relationships between the reactor chamber, cyclone separators, and pressure vessel for use in calculations for optimizing the reactor chamber cross-sectional area for a given pressure vessel diameter.

FIG. 13 illustrates schematically a reactor 60 having dimensional indications thereon for the purpose of illustrating how an optimized size of reactor chamber for a particular diameter pressure vessel 61 may be mathematically calculated. The pressure vessel 61 has an internal diameter D, while the reaction chamber 62 has a width dimension w and a length dimension L. A plurality of cyclone separators 63 are shown on each side of the chamber 62, x number of separators 63 being provided, each shown as having a square cross-section of side dimensions d.

As is clear from FIG. 13, the cross-sectional area of the reactor chamber 62 is 1 times w, while the area of the vortex chambers of the cyclone 63 is x (in this case 8) times $d^2$. Since it desirable that the area of the reactor chamber 62 equal the area of the vortex chamber 63, the following equations are accurate:

$$\sqrt{\left(\frac{L}{2}\right)^2 + \left(\frac{W}{2}\right)^2} \leq \frac{D}{2}$$

$$\sqrt{\left(\frac{w}{2}+d\right)^2 + 0.0625x^2 (d^2)} \leq \frac{D}{2}$$

Thus, by substituting in desired values for x and "D" the maximum area of the reactor chamber 62 may be calculated mathematically. Of course the maximum reactor chamber area is not always used, however, since more economical and cost effective solutions may exist due to other factors such as the inlets and outlets of the pressure vessel, the positioning of various accessories, etc., but the maximum size calculation for the reactor chamber 62 is worthwhile in many circumstances.

The invention is also and more particularly, advantageous in providing the ability to eliminate a separate pressure vessel for filtering of the gases discharged from the outlets of the centrifugal separators, such as by using ceramic filtering means, such as shown in U.S. Pat. Nos. 5,114,581 and 4,793,292. Such arrangements provide a larger filter area/volume ratio which reduces the space required for a filter unit, and allows mounting of the units directly within a pressure vessel, the particular combination of the pressure vessel and quadrate cyclones according to the present invention providing sufficient interior space to allow mounting of the ceramic filters within the same pressure vessel as the reactor chamber and cyclone.

Figure 14:
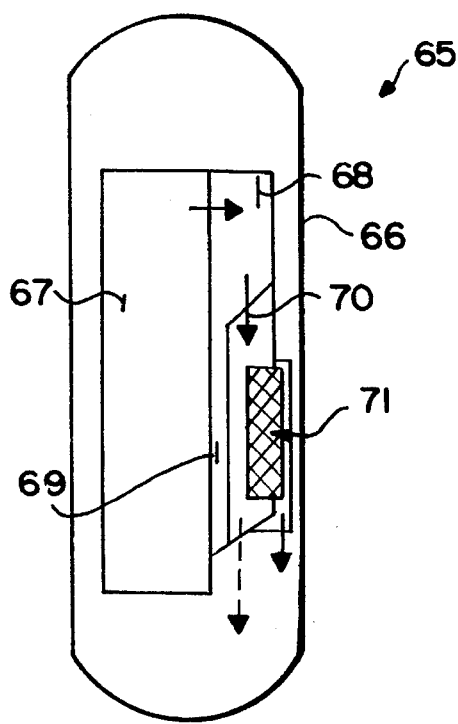
FIG. 14 is a side schematic view of another exemplary reactor according to the present invention showing gas filtering elements mounted on the pressure vessel adjacent the cyclone separator gas outlet.
Figure 15:
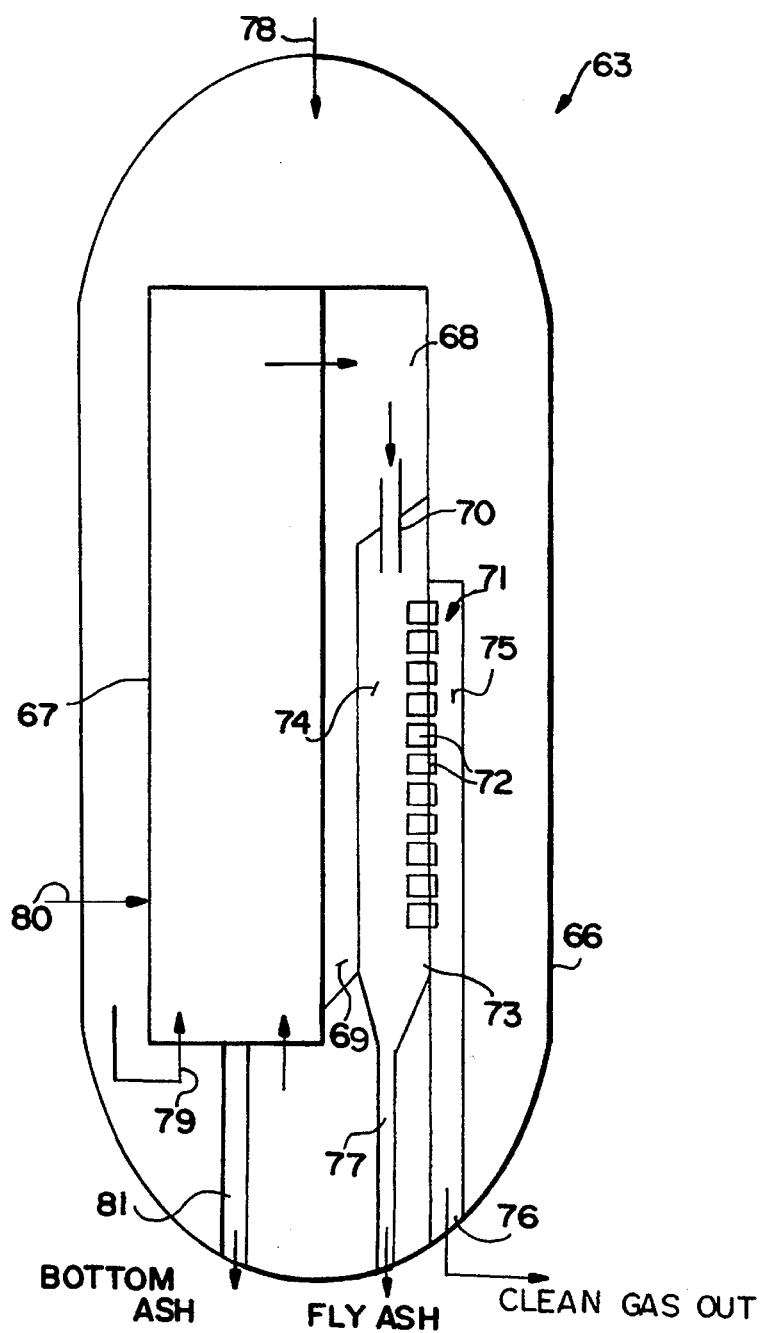
FIG. 15 is a detail view of the reactor of FIG. 14 showing the individual filter elements in the form of ceramic filter candles or monoliths.

FIGS. 14 and 15 show schematically, and in slightly more detail, one embodiment of a pressurized circulating fluidized bed reactor 65 according to the present invention which contains ceramic filter elements. Within the pressure vessel 66 is the reaction chamber 67, one or more quadrate cross-section cyclones 68 mounted on one or opposite sides of the reactor chamber 67, a particles recirculating conduit 69 from the cyclone 68, and the gas outlet 70 from the cyclone 68 leading to the ceramic filtering means 71. The individual filters of the ceramic filtering means are shown by reference numerals 72 in FIG. 15, and are shown extending generally horizontally, mounted by a support structure 73, and having a dirty gas inlet 74 on one side thereof (communicating with the conduit 70), and a clean gas chamber 75 on the opposite side thereof, communicating with the clean gas outlet 76 penetrating the pressure vessel 66 and leading to further processing (e.g. to a turbine for recovery of the heat energy therefrom). An ash outlet, e.g. for fly ash or other particles, is provided at 77 in the bottom of the dirty gas chamber 74, which is for disposal of the particles separated from the gas passing through the filters 72. The particles are typically dislodged by backflushing the filter 72 in a conventional manner, such as shown in U.S. Pat. No. 5,242,472 (not shown in the drawings here).

As seen in FIG. 15, air under pressure is introduced at 78 to the top of the pressure vessel 66, passes around the reactor chamber 67 to flow upwardly as fluidizing air as illustrated at 79, fuel and sorbents, or the like, are added to the reactor chamber 67 as indicated at 80, and ash for disposal is removed through conduit 81 at the bottom of the reactor chamber 67. Utilizing the teachings of the present invention, it is cost effective to provide sufficient filter area within the reactor pressure vessel 66 to effectively filter all of the gas produced by a reactor of substantially optimum size provided within the vessel 66.

Figure 16:
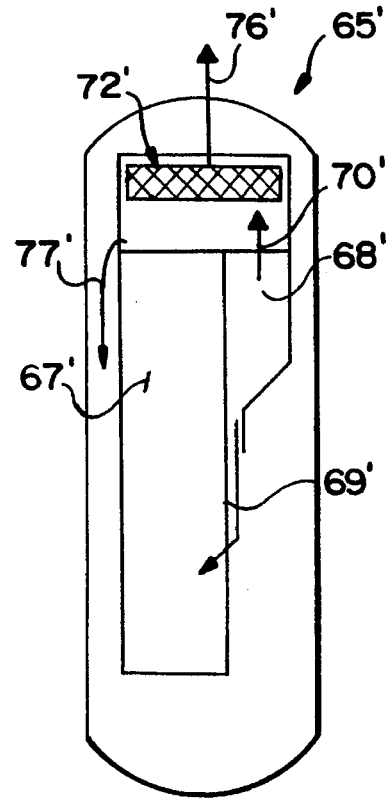
FIG. 16 is a view like that of FIG. 14 only for yet another embodiment of reactor according to the present invention.

FIG. 16 illustrates a slightly different version of the reactor 65' of FIGS. 14 and 15. In this embodiment components comparable to those in the FIGS. 14 and 15 embodiment are shown by the same reference numeral only followed by a "'". The main difference between the reactor 65' and the reactor 65 is that the gas outlet 70' from the cyclone 68' is upward, and the individual filters of the ceramic filtering means 71' are mounted above the reactor chamber 67' and the cyclone 68'.

Figure 17:
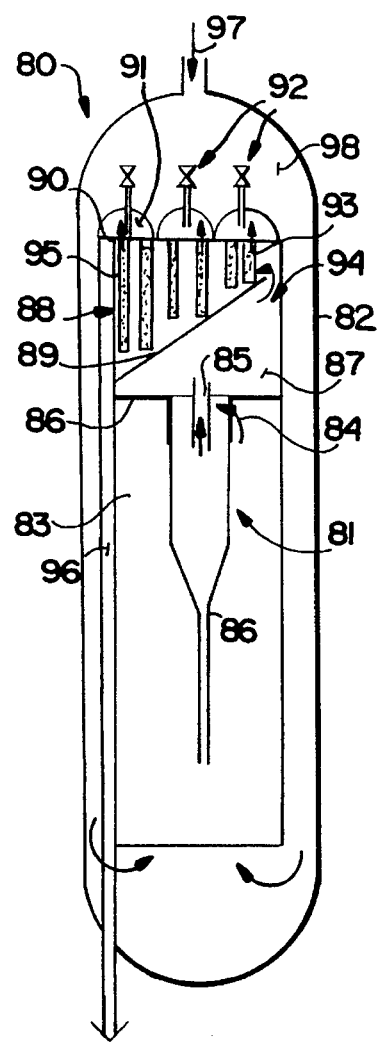
FIG. 17 is a side schematic view of a final exemplary embodiment of pressurized circulating fluidized bed reactor according to the present invention.

FIG. 17 illustrates another embodiment of a pressurized circulating fluidized bed reactor 80, according to the present invention, in which the cyclone and ceramic filters are positioned differently. FIG. 17 schematically illustrates the cyclone 81 not only positioned within the pressurized vessel 82, but also positioned within the volume defined by the reactor chamber 83 itself, hot gases near the top of the reactor chamber passing through the inlet 84 into the cyclone 81, with the particles-separated gas passing out the gas outlet 85 within the vortex finder, while the separated particles are recirculated through conduit 86 into the bottom of the reactor chamber 83. The cyclone 81 is mounted on a support 86 defining a plenum 87 which is the dirty gas inlet for the elongated (e.g. candle or monolithic) filters shown generally at 88. The candle or monolithic filters 88 are mounted above a sloping floor 89, and extend vertically, supported at the top by a support plate 90, with the clean gas plenum 91 on the opposite side of the filters 88 as the dirty gas plenum 87. In this embodiment, the elongated filters 93 closest to the entrance 94 from the plenum 87 are the shortest, and they get progressively longer, the longest 95 being on the opposite side of the reactor 83 from the first filters 93. The ash discharge conduit 96 for the particles separated by the filters 88 is on the opposite side the reactor 83 from the entrance 94.

Backflushing pulse units are shown generally by reference numeral 92 for periodically cleaning the filters 88. The units 92 are pulse valves, which use the pressurized gas introduced at 97, and when opened backflush the filters 88. One end of each valve 92 is open to the volume 98, while the other end is open for the interior of the filters 88. The pressure of gas in the volume 98 surrounding the valves 92 compared to the pressure surrounding the filters 88 is sufficient for backflushing purposes. This arrangement is highly advantageous since it eliminates compressed gas lines penetrating the reactor 80 shell and an external pressurized tank.

It will thus be seen that according to the present invention a compact, cost-effective, efficient pressurized circulating fluidized bed reactor has been provided. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A pressurized fluidized bed reactor comprising:

a pressure vessel, circular in cross-section, and capable of withstanding pressures greater than 2 bar, and having a top and a bottom;

means for pressurizing said vessel to a pressure of greater than 2 bar;

a reactor chamber defined within said pressure vessel including side walls and a ceiling;

means for introducing fluidizing gas into said reactor chamber;

means for feeding fuel into said reactor chamber;

means for leading hot combustion gases away from said reactor chamber having first and second ports;

a first centrifugal separator disposed within said pressure vessel, and having an inlet connected to said first port of said means for leading hot combustion gases away from said reactor chamber, a gas outlet leading from said separator out of said pressure vessel, and a return duct for recirculating separated solid particles from said separator to said reactor chamber;

said centrifugal separator comprising a vertical vortex chamber having distinctly non-cylindrical walls defining an interior gas space, said gas space having a cross section that is distinctly non-circular, having a circularity greater than or equal to 1.15;

a second centrifugal separator mounted within said pressure vessel, and having an inlet connected to said second port of said means for leading hot combustion gases away from said reactor chamber, a gas outlet from said second separator leading out of said pressure vessel, and a return duct for recirculating separated solid particles from said second separator to said reactor chamber;

said second centrifugal separator comprising a vertical vortex chamber having distinctly non-cylindrical walls defining an interior gas space, said gas space having a cross section that is distinctly non-circular, having a circularity greater than or equal to 1.15; and wherein said first and second centrifugal separators are substantially identical, and are disposed on the same side of said reactor chamber, one positioned above the other.

2. A pressurized fluidized bed reactor as recited in claim 1 wherein said first centrifugal separator gas outlet discharges downwardly, and wherein said second centrifugal separator gas outlet discharges upwardly; and wherein said separators are mounted one above the other, with said first separator on top, on one side of said reactor chamber, and have a common plenum connected to said gas outlets therefrom.

3. A pressurized fluidized bed reactor comprising:

a pressure vessel, circular in cross-section, and capable of withstanding pressures greater than 2 bar, and having a top and a bottom;

means for pressurizing said vessel to a pressure of greater than 2 bar;

a reactor chamber defined within said pressure vessel including side walls and a ceiling;

means for introducing fluidizing gas into said reactor chamber;

means for feeding fuel into said reactor chamber;

means for leading hot combustion gases away from said reactor chamber;

a centrifugal separator disposed within said pressure vessel, and having an inlet connected to said means for leading hot combustion gases away from said reactor chamber, a gas outlet leading from said separator out of said pressure vessel, and a return duct for recirculating separated solid particles from said separator to said reactor chamber;

said centrifugal separator comprising a vertical vortex chamber having distinctly non-cylindrical walls defining an interior gas space, said gas space having a cross section that is distinctly non-circular, having a circularity greater than or equal to 1.15; and further comprising ceramic filtering means, comprising a plurality of individual filters mounted in a support structure within said pressure vessel, and having a dirty gas inlet, a clean gas outlet, and an ash outlet; said dirty gas inlet connected to said separator gas outlet.

4. A pressurized fluidized bed reactor as recited in claim 3 wherein said separator is mounted along said side wall of said reactor chamber, and wherein said support structure and said filters of said filtering means are mounted to the same side wall of said reactor chamber as said separator, beneath said separator, said filters extending generally horizontally.

5. A pressurized fluidized bed reactor as recited in claim 3 wherein said separator is mounted along the side wall of said reactor chamber, and wherein said support structure and said filters are mounted above said reactor chamber ceiling and above said separator.

6. A pressurized fluidized bed reactor as recited in claim 3 wherein said separator is mounted within the volume defined by said reactor chamber, and wherein said gas outlet is directed upwardly, and wherein said support structure and said filters are mounted above said reactor chamber ceiling and above said separator.

7. A pressurized fluidized bed reactor as recited in claim 6 wherein said filters are elongated and are disposed vertically; and wherein said dirty gas inlet is at a first side of said reactor chamber, wherein said ash outlet is on a second, opposite side of said reactor chamber.

8. A pressurized fluidized bed reactor as recited in claim 7 further comprising a downwardly sloping floor extending from said first to said second side of the reactor chamber; and wherein said elongated filters extend toward said sloping floor and said filters are each of a length selected to extend proximate to said floor, wherein the filters adjacent to the first side of the reactor chamber are shorter than the filters adjacent the second side.

9. A pressurized fluidized bed reactor as recited in claim 3, wherein said means for pressurizing said pressure vessel comprises means for introducing oxygen containing gas under pressure at the top of said vessel to pressurize the interior thereof, said means for introducing fluidizing gas to said reactor chamber introduces the fluidizing gas at the bottom of the chamber.

10. A pressurized fluidized bed reactor as recited in claim 3 further comprising backflushing means coupled to said filtering means and mounted completely within said pressure vessel for periodically backflushing said filters to clean the filters.

11. A pressurized fluidized bed reactor as recited in claim 10 wherein said backflushing means comprises a plurality of pulse valves, each communicating at one end thereof with said vessel, and at another end thereof with an interior portion of at least one filter.

12. A pressurized fluidized bed reactor comprising:

a pressure vessel, circular in cross-section, and capable of withstanding pressures greater than 2 bar, and having a top and a bottom;

means for pressurizing said vessel to a pressure of greater than 2 bar;

a reactor chamber defined within said pressure vessel including side walls and a ceiling;

means for introducing fluidizing gas into said reactor chamber;

means for feeding fuel into said reactor chamber;

means for leading hot combustion gases away from said reactor chamber;

a centrifugal separator disposed within said pressure vessel, and having an inlet connected to said means for leading hot combustion gases away from said reactor chamber, a gas outlet leading from said separator out of said pressure vessel, and a return duct for recirculating separated solid particles from said separator to said reactor chamber;

said centrifugal separator comprising a vertical vortex chamber having distinctly non-cylindrical walls defining an interior gas space, said gas space having a cross section that is distinctly non-circular, having a circularity greater than or equal to 1.15;

wherein said gas space has a quadrate cross section, the separator constructed of primarily substantially flat panels; and wherein said separator includes at least two of generally identical separators; and wherein said reactor chamber has a first cross-sectional area, and wherein each of said separators has a second cross-sectional area of the gas space thereof, and wherein said first cross-sectional area is substantially equal to the sum of said second cross-sectional areas.

13. A pressurized fluidized bed reactor as recited in claim 12 wherein D is internal diameter of said pressure vessel, d is the length of each side of each separator gas chamber, and L and w are the length and width of said reactor chamber and x is the number of separators; and wherein the optimized area of the reactor chamber for a selected diameter D of pressure vessel, is determined solving the equations $$\sqrt{\left(\frac{L}{2}\right)^2 + \left(\frac{w}{2}\right)^2} \leq \frac{D}{2}$$

$$\sqrt{\left(\frac{w}{2}+d\right)^2} + 0.0625x^2(d^2) \leq \frac{D}{2}$$

* * * * *